United States Patent [19]

Jutzi

[11] 3,751,687

[45] Aug. 7, 1973

[54] INTEGRATED SEMICONDUCTOR CIRCUIT FOR DATA STORAGE

[75] Inventor: Wilhelm Jutzi, Wadenswil, Switzerland

[73] Assignee: International Business Machines Corporation, Armonk, N.Y.

[22] Filed: June 30, 1971

[21] Appl. No.: 158,465

[30] Foreign Application Priority Data

July 1, 1970 Switzerland .......................... 9957/70

[52] U.S. Cl. .................. 307/279, 307/238, 307/292, 307/303

[51] Int. Cl. .......................... H03k 3/26, G11c 11/34

[58] Field of Search ..................... 307/238, 279, 292, 307/303; 317/235, 22.2 G; 340/173 FF

[56] References Cited

UNITED STATES PATENTS

| | | | |
|---|---|---|---|
| 3,573,758 | 4/1971 | Henle | 307/279 X |
| 3,588,846 | 6/1971 | Linton | 307/279 X |
| 3,602,781 | 8/1971 | Hart | 317/235 |
| 3,422,282 | 1/1969 | Orrell, Jr. | 307/292 X |
| 3,423,737 | 1/1969 | Harper | 307/292 X |
| 3,492,661 | 1/1970 | Pricer | 307/238 X |
| 3,540,010 | 11/1970 | Heightley et al. | 307/292 X |
| 3,564,300 | 2/1971 | Henle | 307/292 X |
| 3,573,505 | 4/1971 | Gaensslen | 307/279 |
| 3,610,967 | 10/1971 | Palfi | 307/279 X |
| 3,618,046 | 11/1971 | Bryant | 307/279 X |

OTHER PUBLICATIONS

Statz, "Fabricating Field Effect Transistors," IBM Tech. Disclosure Bull., Vol. 2, No. 4, [Sept. 1968].

Ames et al., "FET's Utilizing Schottky Barrier Principle," IBM Tech. Disc. Bull., Vol. 9, No. 10, [Mar. 1967].

*Primary Examiner*—Stanley D. Miller, Jr.
*Attorney*—Joe L. Koerber

[57] ABSTRACT

A storage circuit for binary data designed for application in a functional memory. The circuit uses Schottky gate field effect transistors. It is arranged to enable layout on a very small surface area of a monolithic semiconductor crystal. The circuit is a modified bistable multivibrator in which the two transistors have one electrode in common. Decoupled connections are arranged at the end of the load resistors remote from the transistors.

2 Claims, 5 Drawing Figures

PATENTED AUG 7 1973 3,751,687

INVENTOR.
WILHELM JUTZI
BY Joe L. Koerber
ATTORNEY

INTEGRATED SEMICONDUCTOR CIRCUIT FOR DATA STORAGE

CROSS REFERENCES

The present circuit is particularly suitable for use in an associative storage or a functional storage. In an associative storage, the stored information is compared with search arguments in an associative way. In a functional storage, logic operations may be performed inside the storage. Reference is made to Swiss patents Nos. 477,070, issued Aug. 15, 1969, and 491,440, issued May 31, 1970, where these storages are described in more detail.

BACKGROUND OF INVENTION

Storages of this kind are already known. Conventionally, bistable circuits like multivibrators are used and interconnected into matrices. A functional storage needs, for processing of binary information, three stable states per cell and therefore two multivibrator circuits are used in each cell. The bits of an information word are written and read in parallel, as in a conventional store. In a search operation, a word in storage can be found by comparison with a word registered in an input-output register. The digit lines and word lines in the storage matrix are used for both read and write operations.

The circuits used in the storage cells for storage of individual data bits should, for economic reasons, allow as high a packing density as possible. The packing density is dependent in part upon the power consumption of each cell which, in connection with the geometric arrangement and other parameters, determines the heat development. A higher packing density, therefore, requires a low power loss. Furthermore, the packing density depends upon the smallest dimensions with which practical elements can be made. Within the limits of today's technology, the smaller the elements are, the simpler they are to make. The circuit of a storage cell, therefore, should be as simple as possible in its arrangement and consist of a minimum of individual circuit elements. Storages of the kind under consideration are commonly made as integrated semiconductor devices and a large number of equal circuits are arranged on a single crystal, e.g., of silicon. Since the price of such devices depends essentially upon the crystal surface required, it is desirable to accommodate as large a number of circuits as possible on a given surface area. The information content of storage circuits of the kind under consideration which makes use of the principle of the bistable multivibrator will normally be read out by means of differential amplifiers. Naturally this requires a large read current ratio, i.e., the ratio of current flowing through the conducting branch to the current flowing through the non-conducting branch of the multivibrator. This ratio is limited because the field effect transistors used always carry a certain leakage current in their non-conducting state. By an intricate arrangement of the transistor, the leakage current may be reduced to some extent. This, however, requires a larger gate capacity which in turn reduces the speed of writing into the cell because the write operation requires this capacity to be recharged. In many applications of associative storages, far more read operations are required than write operations and therefore a relatively slow write operation may be acceptable if the read and search operation can be made very fast.

It is the object of this invention to generally reduce the above-mentioned drawbacks.

In particular, one object of the invention is a circuit which consumes less electric energy than hitherto known circuits.

A further object of the invention is an integrated storage circuit requiring a particularly small area of semiconductor surface.

A further object of the invention is a storage circuit in which the write operation requires recharging of very small capacities and which nevertheless produces a sufficiently high read current ratio.

SUMMARY OF THE INVENTION

The above-mentioned objects are realized by an integrated semiconductor circuit for storage of data in at least one multivibrator circuit, the branches of which consist of a transistor and a load resistance and are provided with double connections of a storage matrix. According to the invention, the double connection is arranged at the end of the load resistors which are remote from the transistors.

The invention will now be explained in detail by means of examples depicted by the following drawings.

DETAILED DESCRIPTION OF THE INVENTION

In a functional storage or associative storage for binary information, each storage cell needs three stable states. Since conventionally two bistable multivibrators have been used for this, four different signal combinations per cell are available of which normally only three are used. In some storages, however, the fourth position is used for the purpose of error detection. For the following description it suffices to consider one single bistable multivibrator, i.e., one half of a storage cell, since all considerations are applicable upon the complete storage cell consisting of two multivibrators.

Figure 1:
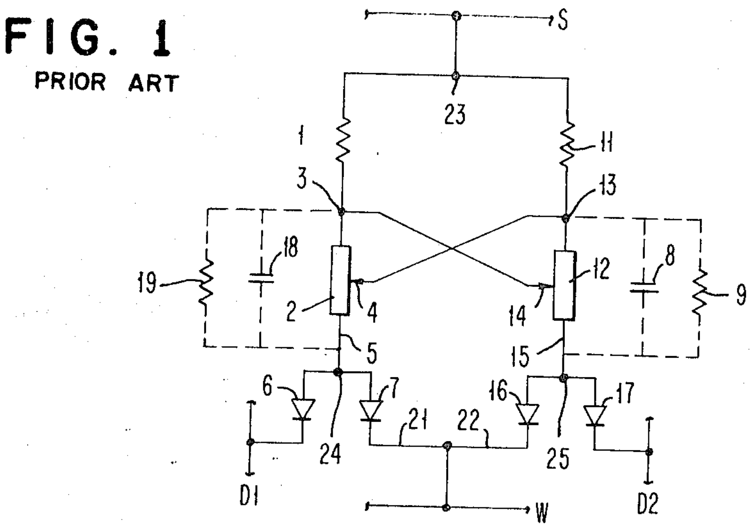
FIG. 1 PRIOR ART
FIG. 1 is a bistable multivibrator circuit for storage of data.

The circuit of FIG. 1 depicts a conventional bistable multivibrator consisting of two field effect transistors 2 and 12 with Schottky contact gates. Drain electrodes 3 and 13 of the transistors are connected to load resistances 1 and 11, source electrodes 5 and 15 are connected to decoupling diodes 6, 7, and 16, 17 respectively, while gate electrodes 4 and 14 are connected to the drain electrode of the respectively opposite transistor 13 and 3. The point 13, i.e., the connection between drain of one transistor and its load resistance as well as the gate of the other transistor, is loaded by parasitic capacity 8 and parasitic resistance 9, both schematically represented in broken outline in FIG. 1. The capacity 8 is mainly constituted by gate contact 4 while the resistance 9 mainly consists of the diode resistance of gate contact 4 which is low when the diode constituting the gate is conductive and relatively high when it is non-conductive.

The transistors employed in this circuitry consist of a high ohmic semiconductor body on which an N-conductive channel layer is deposited. The channel layer bears two ohmic contacts for source and drain as well as a Schottky contact for the gate. The channel layer is thin enough so that the contact voltage naturally appearing across the Schottky contact is sufficient to block the transistor. This type of transistor has been described in more detail, e.g., in Swiss patent No. 506,920, Jutzi, issued Apr. 30, 1971.

It may be assumed now that transistor 2 is in its conductive state while transistor 12 is in its non-conductive state. Positive voltage is supplied by the normally grounded supply line S. A current flows across load resistance 1, through transistor 2, through diode 7, to the negatively biased word line W. The load resistor constitutes, together with the transistor and the subsequent diode, a voltage divider and the voltage at point 3 which equals the voltage at gate 14 is, therefore, low. The voltage at point 13, in contrast, is high. Load resistance 11 also carries some current because the diode constituted by gate 4 is conductive in the state under consideration here.

To read out stored information, word line W is pulsed with a positive signal. This causes the current which is flowing across transistor 2, through diode 6, into a differential amplifier (not shown) connected between digit line D1 and digit line D2. The differential amplifier determines which of the two transistors 2 and 12 is in its conductive state. To write an information bit into the cell, word line W is provided with a positive pulse.

To bring transistor 12 into a conductive state and transistor 2 into a non-conductive state, digit line D1 is provided with a simultaneous positive pulse. This causes the current in transistor 2 to be interrupted, thereby raising drain voltage 3 and opening gate 14.

The word line W has to be decoupled from digit lines D1 and D2. In the circuit of FIG. 1, diodes 6, 7, 16 and 17 serve that purpose. For certain applications, however, it may be advantageous to use transistors for decoupling instead of diodes. This is true for the circuit just described as well as for those that will be described hereafter.

To operate the storage at high speed, it is one obvious requirement that any stray capacities be charged or decharged, respectively, very rapidly. To provide sufficient stability of the storage, the leakage resistances 9 and 19, furthermore, have to be sufficiently large.

Figure 2:
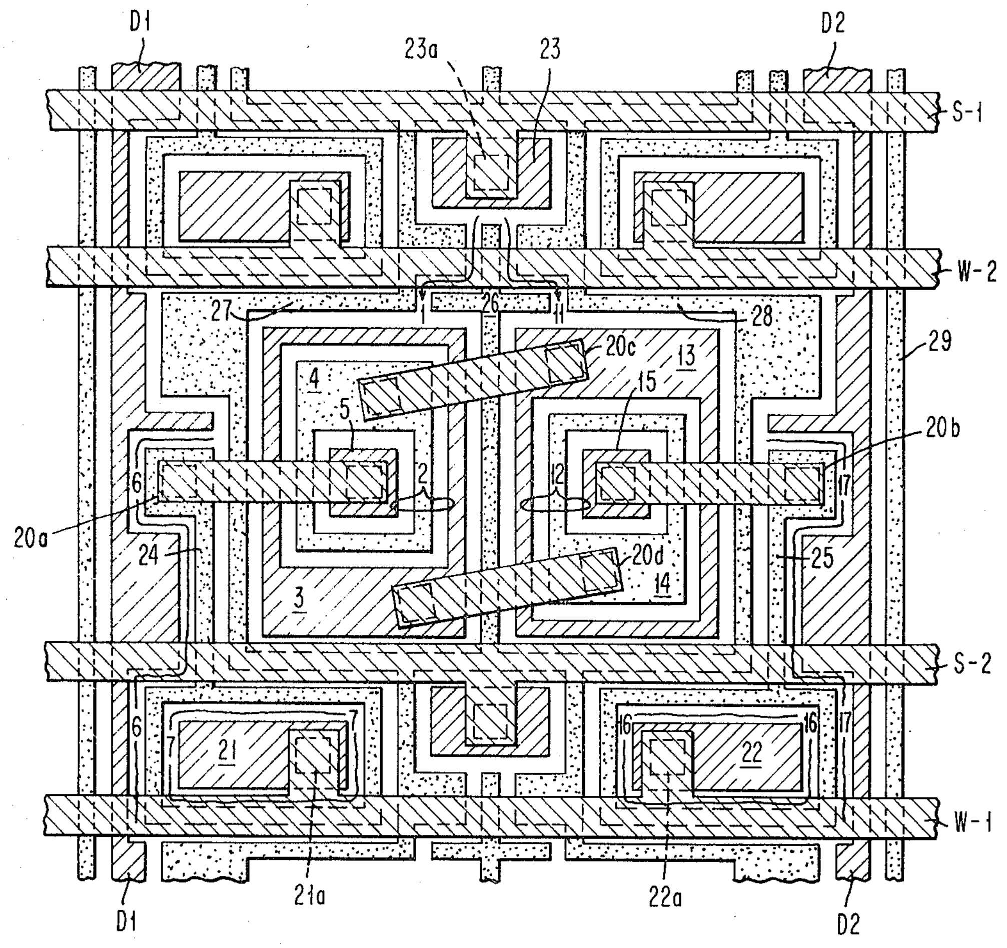
FIG. 2 PRIOR ART
FIG. 2 is a practical layout of the circuit of FIG. 1 on the surface of a monolithic semiconductor body.

FIG. 2 depicts a possible layout of the just described cell in integrated fashion on the surface of a monolithic semiconductor crystal. Stipling and hatching are used to clearly depict the various parts of the circuit. The cell is arranged together with a great number of equal cells in a matrix, the horizontal lines of which are indicated by the word lines, while the columns are indicated by the digit lines. The circuit is that depicted in FIG. 1. Transistor 2 may be recognized at left from center and transistor 12 at right. In the middle of transistor 2 is source 5 surrounded by gate 4 which in turn is surrounded by drain 3. The load resistor 1 is constituted by an elongated part of free crystal surface which is enclosed between branches 26 and 27 of the insulation contact.

The elongated insulation contact which branches out across the crystal surface is a Schottky contact just like the gate contacts 4 and 14. Since, as has been mentioned, the conductive channel layer on the crystal surface is sufficiently thin that the natural contact voltage appearing across a Schottky gate contact suffices to completely block any current, it is sufficient to provide such a contact between points of different potential to insulate them from each other. In the present circuit, the insulation contact, furthermore, may be connected to ground at some point not shown.

Each transistor is insulated electrically from its surroundings by such a Schottky contact, branches of the contacts being designated 26, 27 and 28. Openings within the insulation contact are used as load resistances 1 and 11, the sizes of which are determined by the surface resistance of the conductive channel layer and the length and width of the opening. If necessary, the load resistance is arranged in the form of a meander.

The upper end of the load resistances 1 and 11 respectively leads to ohmic contact 23, which is connected to power supply line S–1. The supply line S–1 is a metal deposited line on top of the insulating layer and contacts point 23 through a window **23*a*** provided in that layer.

The digit lines D1 and D2, respectively, may be recognized at left and right of the circuit layer. It is arranged directly on the crystal surface in form of an ohmic contact. At right of digit line D2, an elongated Schottky contact 29 may be recognized which insulates the line of the just opposed digit line of the next column of similar storage cells. Opposite to the digit lines, about in the middle of the layout, Schottky contacts 24 and 25 are arranged which together with the digit lines constitute diodes 6 and 17, respectively. Schottky contacts 24 and 25, respectively, surround furthermore the ohmic contacts 21 and 22, respectively, which are contacted through windows **21*a* and 22*a* by word line W–1** arranged on top of the insulating layer.

The circuit arrangement is finally completed by metallic bridges or jumpers **20*a* and 20*b* interconnecting the sources 5 and 15, respectively, of each transistor with the common anodes 24 and 25 of diode pairs 6, 7 and 16, 17, respectively. Similar jumpers or bridges 20*c* and 20*d* also provide connections between gate 4 and drain 13 as well as gate 14 and drain 3. A word line W–2 crossing the layout, serves a cell above the one shown. A power supply line S–2**, serves a cell below the one shown within the same column.

In the circuit last described above, the two transistors 2 and 12 constituting the multivibrator of each storage cell are completely separated electrically from each other. On the crystal surface into which the transistors are integrated, an isolation contact branch 26 is arranged in between them.

It is evident that surface area in the layout may be saved if it is possible to design a circuit in which the transistors have at least one electrode in common. Such a circuit will now be explained by means of FIG. 3.

Figure 3:
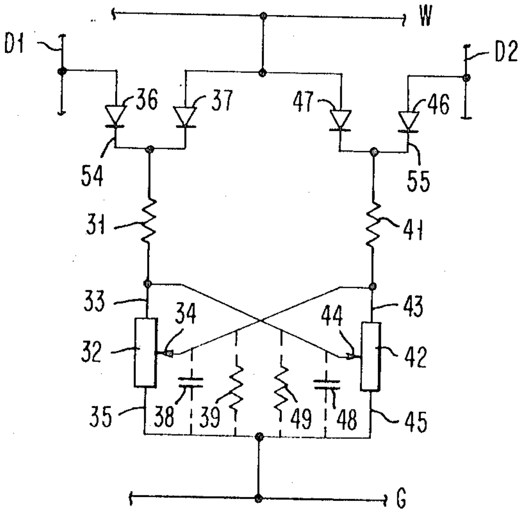
FIG. 3 is another bistable multivibrator circuit for storage of data.

The circuit of FIG. 3 shows, like FIG. 1, a bistable multivibrator suitable as cell of a storage matrix. In contrast to the circuit of FIG. 1, signal decoupling between word lines and digit lines does not occur at the cathode end of the circuit, but rather at the anode end. Positive supply voltage is fed over the word line W, whereas negative voltage is applied via the normally grounded line G. It may be assumed that transistor 32 is conductive while transistor 42 is in non-conductive state. If this state is to be interrogated, the word line W is provided with a negative pulse while both digit lines D1 and D2 are provided with a positive pulse each. The current for transistor 32 flows now across load resistance 31 and diode 36 from line D1, whereas only a leakage current flows from the line D2 across diode 46 and load resistance 41 into gate 34. This load is indicated schematically by dotted resistance 39. The fact that digit line D1 carries current, while digit line D2 is essentially free of current, is established by means of a differential amplifier (not shown) connected between lines D1 and D2.

If new information is to be registered in the circuit which would correspond to the conductive state of transistor 42 and the non-conductive state of transistor 32, then the word line W is provided with a negative pulse. The digit line D1 remains positive while digit line D2 obtains a negative pulse. The residual current in transistor 42 is interrupted. The drain voltage at point 43 decays independent of the time constant of resistance 39 and capacitance 38. Simultaneously, transistor 32 becomes blocked. This causes the drain voltage at point 33 to rise, since the capacitance 48 can be charged by current from the digit line D1 across diode 36 and load resistance 31. When the negative pulse on line D2 ends and, simultaneously, the supply voltage on line W returns, the charged capacity 48 causes transistor 44 to carry current. This occurence differs from the one described in connection with FIG. 1 in as much as the transistor to be blocked is not cut off by means of its drain current but rather by means of its gate voltage.

Figure 4:
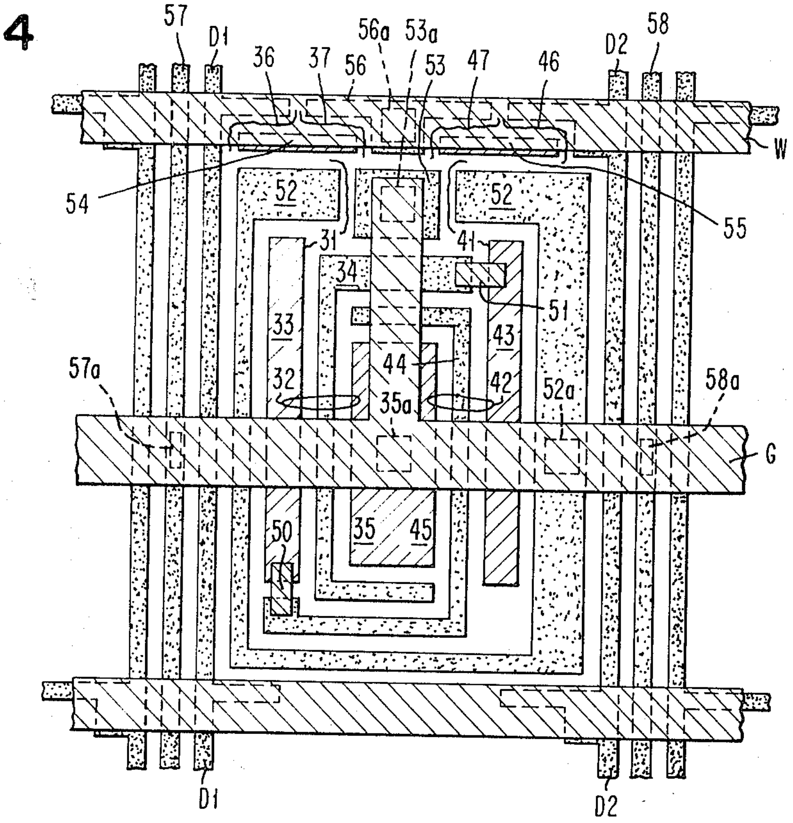
FIG. 4 is a layout of the circuit according to FIG. 3 on the surface of a monolithic semiconductor body.

FIG. 4 shows a layout of the circuit of FIG. 3 on the surface of a semiconductor crystal. This layout is designed for comparable performance and at the same scale as the one of FIG. 2. It is immediately apparent that the new layout requires a smaller crystal surface than the layout depicted in FIG. 2 which corresponds to the circuit of FIG. 1.

In the center of FIG. 4, an ohmic contact is arranged as a common source 35 and 45 for the transistors 32 and 42. The ohmic source contact is surrounded by two strip-like Schottky contacts which constitute the gates 34 and 44, respectively. Outside the gate contacts lay the ohmic drain contacts 33 and 43, respectively, which are connected by metallized cross-overs 50 and 51, respectively, each with the gate of the other transistor. The gate strips 34 and 44 are arranged in meander fashion so as to minimize any leakage current between source and drain which might surround the gate.

A frame-like Schottky contact 52 serves as an insulation of the two transistors against the outside world. Load resistances 31 and 41 are formed in the conductive semiconductor surface by gaps between the contact 52 and the rectangular Schottky contact 53. These load resistances end at the ohmic contact areas 54 and 55 which constitute cathodes of two diodes each. One electrode diode 36 is the metallized digit line D1 which constitutes a Schottky contact on the semiconductor crystal. The other electrode of diode 36 is the ohmic contact area 54. Diode 37 has Schottky contact 56 as one electrode, which is connected to word line W, through window 56*a* and has area 54 as its other electrode. Diode 47 has contact 56 as one electrode and area 55 as its other electrode, while diode 46 has digit line D2 as one electrode and area 55 as its other electrode.

Outside both digit lines, the Schottky insulating lines 57 and 58 are arranged and outside of these, digit lines for other storage cells, arranged in the same row of the matrix, are indicated. The insulating Schottky contacts 57, 58, 52 and 53, as well as the ohmic contact 35–45 are electrically connected to the grounded line G through windows 57*a*, 58*a*, 52*a*, 53*a* and 35*a*, respectively, in the insulating layer on top of which the grounded line G is arranged. Also arranged on top of the insulating layer is the word line W-1 and metallic bridges or jumpers 50 and 51.

The different layouts that have been described with regard to FIGS. 2 and 4 are based on the use of a semiconductor substrate of high ohmic resistance which bears a N-conductive layer constituting the channel zone of the field effect transistors. The N-conductive layer extends across the whole surface area of the substrate. To avoid undesired electric connections, several Schottky insulating contacts are arranged, e.g., 27 and 28 in FIG. 2 and 52, 53, 57 and 58 in FIG. 4. These contacts produce a depletion zone in the underlying highly conductive semiconductor layer which acts as an insulator. Since a certain minimal line width of such contacts has to be maintained for reliable manufacturing, these contacts occupy a part of the semiconductor surface required for the storage cell. Striving to reduce the semiconductor surface necessary per cell as much as possible, it is advantageous if these insulating contacts can be saved. As far as manufacturing is concerned, such contacts cause no additional cost since all contacts of the same kind are produced in a single manufacturing step, or number of steps, and it is immaterial whether a larger or smaller number of contacts is made. Their number, however, affects packing density. In the following, an embodiment is described which works without insulating contacts on the semiconductor surface and, therefore, occupies still less surface area.

Figure 5:
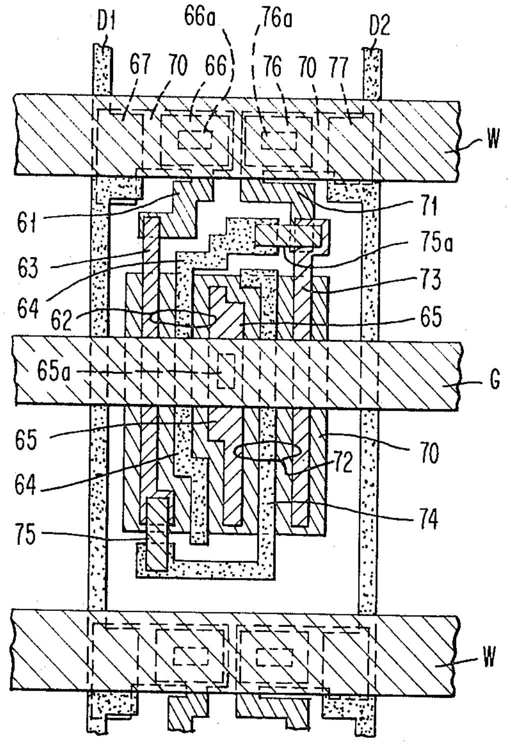
FIG. 5 is another layout of the circuit of FIG. 3.

The circuit of the layout of FIG. 5 is, in its electric properties, equivalent to the circuit of the layout of FIG. 4. It is made, however, on a substrate, the surface of which is covered with a conductive semiconductive layer only in certain selected areas. A number of procedures are known to achieve this result. For example, the conductive semiconductor layer can be etched away in places where it is undesired.

Alternatively, it is possible to epitaxially deposit the layer selectively, in places where it is desired. Since the two just mentioned possibilities create surface irregularities on the crystal, it may be advantageous to first produce recesses in the plane surface of a high ohmic substrate in places where a conductive layer is desired. This may be done, e.g., by etching. The recesses may then be filled, e.g., epitaxially with highly conductive material. With the technique of ion implantation into semiconductor material which is available today, it is also possible to treat certain areas of high ohmic semiconductor surface in order to dope them for high conductivity up to a certain depth. All these procedures are already known, and do not need detailed description here.

FIG. 5 shows the storage according to FIG. 3 arranged between digit lines D1 and D2. Source contact 65, which is common to both transistors, extends essentially parallel to the digit lines in the center of the drawing. It is connected to common ground return line G through an aperture 65*a* in the oxide layer which covers the circuit. At left of the ohmic contact 65, extends transistor 62 and at right the transistor 72. Transistor 62 has the Schottky gate contact 64 and the ohmic drain contact 63. Transistor 72 has the Schottky gate contact 74 and the ohmic drain contact 73. Underneath these two transistors, the conductive zone 70 is arranged within the crystal. The lower end of drain contact 63 is connected to gate 74 by means of a metallized bridge 75. The upper end of the drain contact 73 is connected with the gate 64 by means of a metallized bridge 75*a*. From the upper end of the drain contact 63 extends the load resistance 61 in form of a narrow conducting zone. Similarly, load resistance 71 extends from the upper end of the drain contact 73. The load resistances lead to zones 66 and 76, respectively, which carry a Schottky contact constituting a diode. The Schottky contacts are in connection with the word line W-1 through windows 66*a* and 76*a* in the oxide layer. Conductive zones 70, furthermore, connect the load resistance to the diodes 67 and 77, respectively, which in turn are in connection with digit lines D1 and D2, respectively.

If the realistic assumption is made that, in all three embodiments described above, the width of the gate contact as well as the distance between the different contacts is in the order of 1 micrometer, then the surface area occupied by the various layouts on the semiconductor monolith may be compared, provided the active length of the gate contacts is equal in are embodiments. Under these conditions, the layout according to FIG. 2 requires, per storage cell, a crystal surface area of 48 micrometers × 34 micrometers = 1630 micrometers square. The layout according to FIG. 4 in contrast thereto requires 26 micrometers × 34 micrometers = 885 micrometers square. The layout according to FIG. 5, however, requires only 18 micrometers × 30 micrometers = 540 micrometers square. The last embodiment, therefore, requires about one-third of the crystal surface area which is required by the first embodiment.

The first embodiment depicted in FIG. 2 is based on the circuit of FIG. 1. The embodiments of FIGS. 4 and 5 are based on the circuit of FIG. 3. The layout of FIG. 5 again distinguishes from the layout of FIG. 4 by use of a technology needing a conductive surface layer in certain areas of the crystal surface only. This makes the Schottky insulation contacts superfluous which occupy part of the surface area in FIG. 4. The layout of FIG. 2 also contains insulation Schottky contacts which, by use of the technique on which the layout of FIG. 5 is based, might be saved. The arrangement of the layout of the circuit of FIG. 1, in contrast, is so disadvantageous, that by saving the insulation contacts, only modest gains may be achieved. Obviously, the bigger part of the surface area saving is attained by the improved circuit connection which permits using a common source contact for both transistors in the storage cell.

It is obvious for those skilled in the art that the described circuit connection makes numerous layouts possible yielding similar favorable results. Furthermore, processes other than those indicated can be used for its manufacture and finally the use of other materials than those indicated is easily possible without departing from the spirit of the invention.

What is claimed is:

1. An integrated semiconductor multivibrator circuit comprising:

first and second field effect transistors each having source, drain and gate electrodes;

said gate electrodes of said first and second transistor being cross-coupled to said drain electrodes;

said source electrodes connected to a common ground line;

first and second load resistors respectively connected to said first and second drain electrodes;

first and second decoupling semiconductor devices respectively connected to said first and second load resistors;

said first and second decoupling semiconductor devices connected to a common drive line;

third and fourth decoupling semiconductor devices respectively connected to said first and second load resistors in common with said first and second decoupling semiconductor devices;

first and second signal lines respectively connected to said third and fourth decoupling semiconductor devices;

said first and second signal lines being orthogonal to said ground and drive lines.

2. The multivibrator as defined in claim 1 wherein the circuit is fabricated on a low conductivity substrate that is covered with a high conductivity layer, said circuit further comprising insulating zones between charge bearing areas that are formed by Schottky contacts.

* * * * *